United States Patent
Toki

(10) Patent No.: US 6,373,006 B1
(45) Date of Patent: Apr. 16, 2002

(54) OPENING AND CLOSING ANGLE DETECTING APPARATUS AND FOLDABLE DEVICE

(75) Inventor: Nozomi Toki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/690,456

(22) Filed: Oct. 18, 2000

(30) Foreign Application Priority Data

Oct. 22, 1999 (JP) ............................................. 11-301210

(51) Int. Cl.[7] .............................................. H01H 35/42
(52) U.S. Cl. ..................... 200/61.7; 200/1 B; 200/11 G; 455/90; 379/433
(58) Field of Search ............................... 200/1 B, 61.7, 200/1 G, 11 TW; 455/89, 90, 128, 351; 379/433, 434

(56) References Cited

U.S. PATENT DOCUMENTS

| 5,596,181 | A | * | 1/1997 | Bach et al. | ................. | 200/8 R |
| 5,732,331 | A | * | 3/1998 | Harms | ......................... | 455/90 |
| 5,761,300 | A | * | 6/1998 | Domoleczny | ............... | 379/433 |
| 5,930,353 | A | * | 7/1999 | Lee et al. | .................... | 379/433 |
| 6,194,673 | B1 | * | 2/2001 | Sato et al. | ..................... | 200/4 |

FOREIGN PATENT DOCUMENTS

| JP | 9-93316 | 4/1997 |
| JP | 10-126469 | 5/1998 |
| JP | 11-27352 | 1/1999 |

* cited by examiner

Primary Examiner—Lincoln Donovan
Assistant Examiner—Kyung S. Lee
(74) Attorney, Agent, or Firm—McGinn & Gibb, PLLC

(57) ABSTRACT

Apparatus for detecting the opening and closing angle which is easy to switch, is reliable, is capable of positively preventing howling from occurring, can be reduced in size and weight, and uses no special components. The apparatus comprises a first and second hinge portions belonging to a first and second housings, respectively, for pivotal linking said first housing to said second housing. The first hinge portion has on the lateral side a curved surface in a rotational direction of said first housing and comprises a given number of parallel electrodes extending in a rotational direction of said first housing on said convex curved surface. The curved surface portion is disposed in the second housing; the second housing includes therein terminals in pressure contact with said electrodes or the curved surface; the terminals are in contact or non-contact with corresponding electrodes at different predetermined angles depending on the rotation of the first housing.

14 Claims, 3 Drawing Sheets

FIG. 2 (A-1) 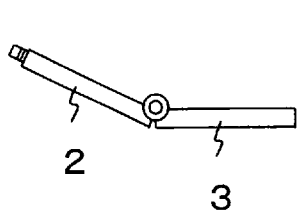
FIG. 2 (B-1) 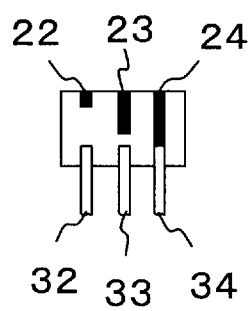
FIG. 2 (C-1) 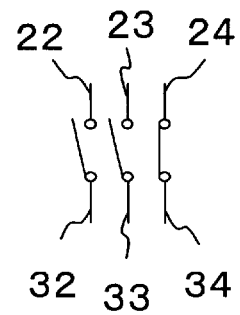
FIG. 2 (A-2) 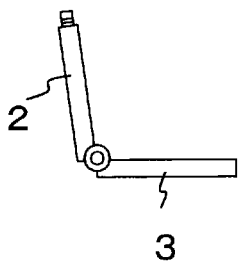
FIG. 2 (B-2) 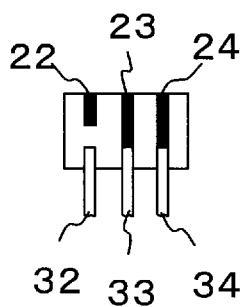
FIG. 2 (C-2) 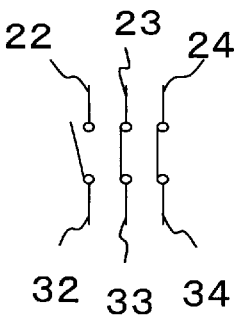
FIG. 2 (A-3) 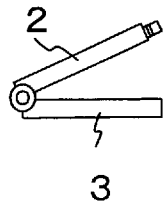
FIG. 2 (B-3) 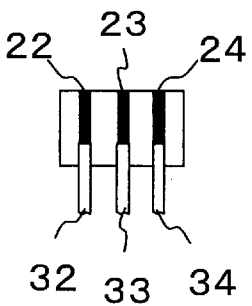
FIG. 2 (C-3) 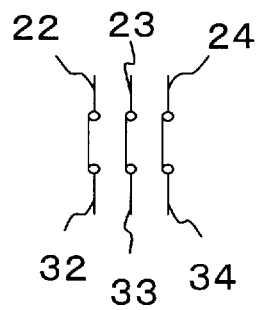

FIG. 3 (A) PRIOR ART
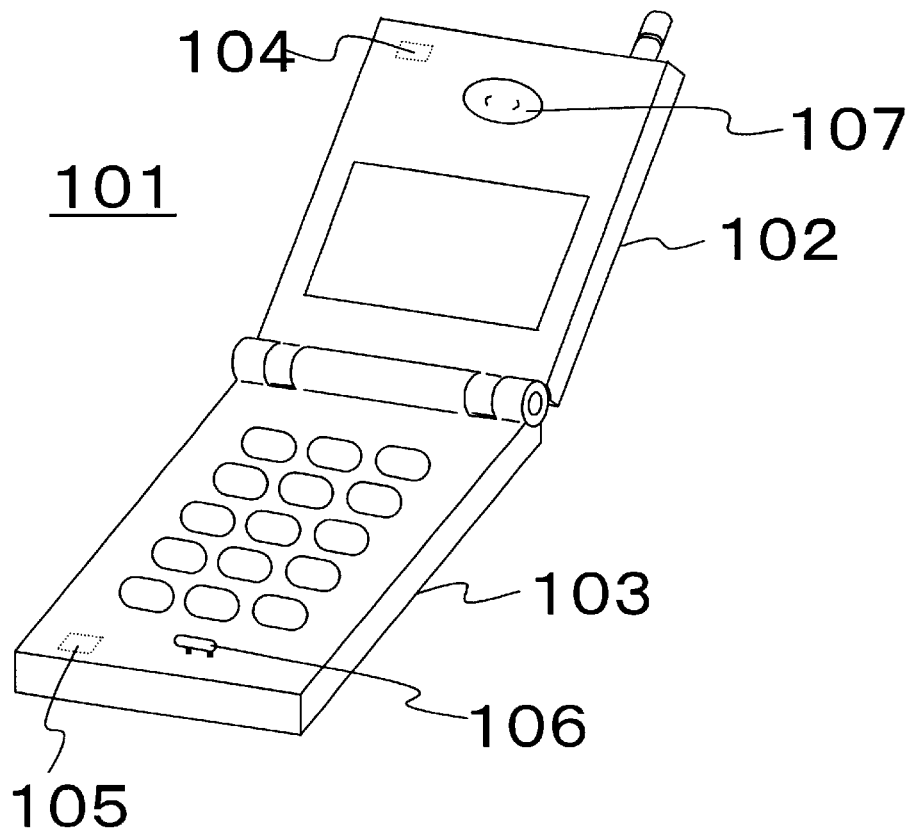
FIG. 3 (B) PRIOR ART
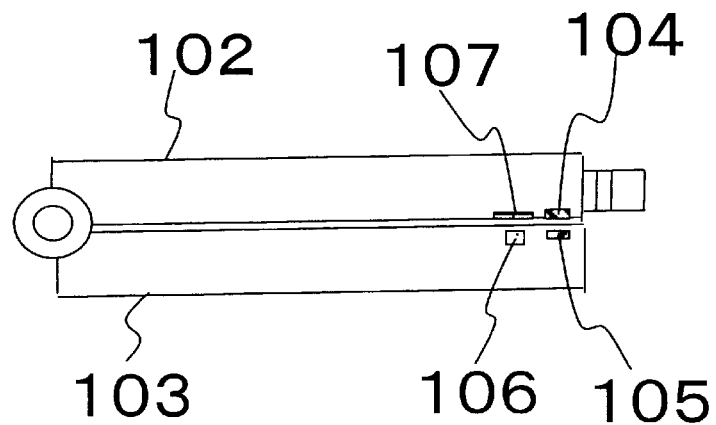

OPENING AND CLOSING ANGLE DETECTING APPARATUS AND FOLDABLE DEVICE

FIELD OF THE INVENTION

The present invention relates to a foldable device such as portable cellular phone, word processor and personal computer, and in particular to an apparatus for detecting the opening and closing angle thereof.

BACKGROUND OF THE INVENTION

The foldable portable cellular phones have heretofore been provided with means for detecting the opening of its housing in order to prevent the wasteful Power consumption when folded or to prevent, so-called howling (picking up of sounds) due to the proximity between a microphone and a receiver from occurring. For further information on the prior art for detecting the magnetic force lines from a magnet, refer to Japanese Patent Kokai Publication JP-A-10-126469, JP-A-11-27352. For further information on the prior art using a push-switch, refer to JP-A-9-93316.

An exemplary prior art will be described with reference to the drawings. FIGS. 3A and 3B show an exemplary prior art foldable portable cellular phone when it is opened and closed, respectively. The foldable portable cellular phone 101 has means for detecting the opening and closing of the phone, comprising a magnet 104 which is mounted on a first housing 102 on the display side of the phone and a reed switch 105 which is mounted on a second housing 103 on the operation side of the phone. The folded condition of the phone is sensed by detecting the magnetic forces from the magnet 104 on the display side by means of the reed switch 105 on the operation side. This detection turns off the power source for the speech circuitry of the microphone 106 and the receiver 107 (to bring the Phone into a non-speech call mode) for preventing the howling from occurring.

SUMMARY OF THE DISCLOSURE

Since the closing or opening is detected immediately before the phone is closed in the prior art, there is a problem that howling due to the proximity between the microphone and the receiver can not be Prevented before the phone is brought into the non-speech call mode. In particular, the means for detecting the magnetic force lines has a disadvantage that the margin of howling, that is the angle at which the phone is brought into non-speech mode can not be increased since such means detects the condition immediately before the phone is folded. There is also a problem the magnetic force fluxes emitted from the magnet may give an adverse influence upon the other circuit components or wrong detection may be conducted due to the magnet in the receiver, etc. Use of detecting means such as push-switch or magnet and reed switch is not advantageous for reduction in size and weight of the Portable cellular phone since a given space is occupied in the housing and predetermined Parts are required.

In association with the advent of recent multifunction portable cellular phones, hands-free speech call via a laud speaker of the phone which is laid on a desk or the like and character communication using the cellular Phone has been generally conducted in addition to normal speech call by closing the receiver and microphone units to the ear and mouth, respectively. In Particular, hands-free speech call is advantageous in that safe speech call is possible while driving an automobile. When the foldable phone is laid so that it is folded at a given angle, it is advantageously possible to view the display and/or listen the voice. If the mode of the phone can be automatically changed depending upon the folding angle, for example, it is in normal speech call and hands-free speech call mode when the phone is flat and is folded in a given angle, respectively, it is convenient. Further, it is more convenient if the modes can be changed depending upon the folding angle in association with the addition of new functions in future.

It is a main aspect of the invention to provide an apparatus for detecting the opening and closing angle, which is easy to conduct switching, reliable and is capable of positively preventing howling from occurring.

It is another aspect of the present invention to provide an apparatus for detecting the opening and closing angle, using no special parts and having reduced size and weight.

In a first aspect of the present invention, an apparatus for detecting the opening and closing angle is characterized in that the apparatus comprises a first and second hinge portions belonging to a first and second housings, respectively for pivotally linking the first housing to the second housing, in that the first hinge portion has a convex curved surface in a rotational direction of the first housing and comprises a given number of parallel electrodes extending in a rotational direction of the first housing on the curved surface, in that the curved surface portion is disposed in the second housing; in that the second housing includes therein a given number of terminals which are in pressure contact with the electrodes or the curved surface; and in that the terminals are in contact or non-contact with corresponding electrodes at different predetermined angles depending on the rotation of the first housing.

In the apparatus for detecting the opening and closing angle of the Present invention, it is preferable that the electrodes have different lengths extending in parallel with each other and in that the terminals are aligned at their tip ends, have a given length and are in parallel with each other.

In the apparatus for detecting the opening and closing angle of the present invention, it is preferable that the electrodes are aligned with each other at their ends, have a given length and are in parallel with each other, and in that the terminals are at their ends in pressure contact with corresponding electrodes in different their positions in a rotational direction thereof.

In the apparatus for detecting the opening and closing angle of the present invention, it is preferable that the curved surface of the first hinge portion has grooves for guiding the terminals along the corresponding electrodes and their extensions.

In the apparatus for detecting the opening and closing angle of the present invention, it is preferable that the terminals are springs.

In a second aspect of the present invention, the foldable device is characterized in that the device has the apparatus for detecting the opening and closing angle in the first aspect of the present invention.

In the present invention, it is preferable that the foldable device is a Portable cellular phone, a word processor or a personal computer.

In the present invention, it is preferable that the terminals are at least three in number, and the foldable device is a portable cellular phone having a plurality of speech call modes so that it can be changed into any one of normal speech call mode, hands-free speech call mode and non-speech call mode.

BRIEF DESCRIPTION OF THE DRAWINGS

FIG. 1(A) is a perspective view showing the whole of the foldable portable cellular phone and FIG. 1(B) is an enlarged perspective view showing a portion of the apparatus for detecting the opening and closing angle.

FIG. 2 A schematic view showing the foldable portable cellular phone in which the apparatus for detecting the opening and closing angle of one embodiment of the present invention is incorporated. FIGS. 2(A-1) through 2(A-3) show the folding angles as viewed from the side of the foldable portable cellular phone, FIGS. 2(B-1) through 2(B-3) show the contact conditions between the terminals and the electrodes corresponding to the folding angles, and FIGS. 2(C-1) through 2(C-3) show switch conditions.

F FIG. 3 A view showing an exemplary prior art foldable cellular phone, FIG. 3(A) is a perspective view when the phone is opened and FIG. 3(B) is a sectional view showing the phone when it is closed.

PREFERRED EMBODIMENTS OF THE INVENTION

A hinge portion which pivotally links the first housing with the second housing is formed by linking the first hinge port ion belonging to the first housing with a second hinge portion belonging to the second housing. When the first housing is pivoted relative to the fixed second housing, the first hinge portion belonging to the first housing is also pivoted. The pivotal movement of the first housing causes one point on the outer Periphery of the first hinge portion (point A) to firstly approach toward one point on the surface or inner face of the second housing (point B). Then the point A becomes closest to the point B and then the point A is separated from the Point B. In accordance with such Principle, the apparatus for detecting the opening and closing angle is preferably formed as follows:

In the apparatus for detecting the opening and closing angle, a usual hinge mechanism comprises the first hinge portion belonging to the first housing which pivotally links the first housing with the second housing and the second hinge portion belonging to the second housing. The first hinge portion has on its periphery the curved surface portion extending in a rotational direction of the first housing and comprises a given number of parallel electrodes having different lengths and extending on the curved surface in a rotational direction of the first housing. The curved surface portion is disposed within the second housing. The second housing comprises a given number of terminals which are in pressure contact with the electrodes or the curved surface. This enables the terminals to be in contact with the corresponding electrodes at different angles when the first housing is pivoted so that they can be electrically connected to the electrodes.

Figure 1:
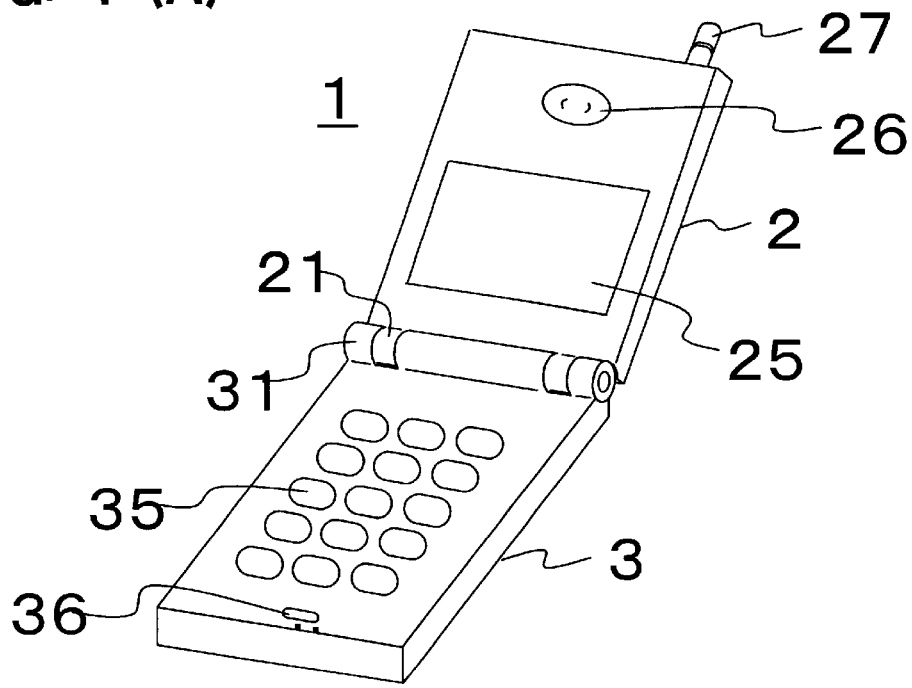
FIG. 1 A view showing a foldable portable cellular phone in which the apparatus for detecting the opening and closing angle of one of embodiment of the present invention is incorporated.
Figure 1:
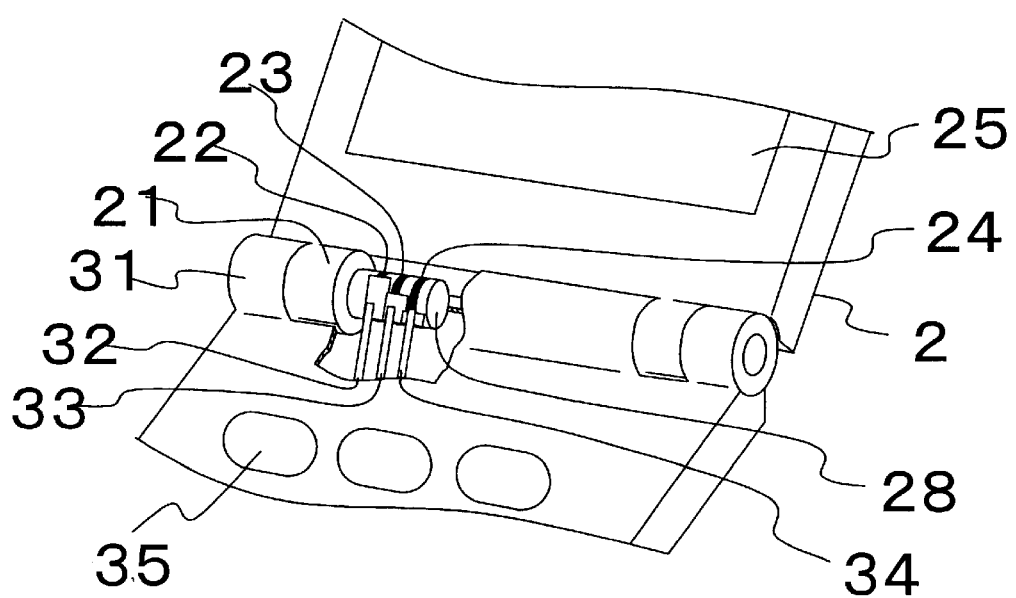

The opening and closing angle detecting apparatus of one embodiment of the Present invention will be described. FIG. 1 shows a foldable portable cellular phone in which the opening and closing angle detecting apparatus of one embodiment of the present invention is incorporated. FIG. 1(A) is a perspective view showing the whole of the foldable portable cellular phone.

FIG. 1(B) is an enlarged perspective view showing the opening and closing angle detecting apparatus portion. This foldable portable cellular phone comprises a first and second housings 2 and 3, respectively The first housing 2 is the. housing on the display side and includes a first hinge portion, first and second and third electrodes 22, 23 and 24, display 25, receiver 26 and an antenna 27.

The first hinge portion 21 is disposed on the side end face of the first housing 2 on the side of the second housing 2 and includes a cylindrical portion 28 having a curved surface extending in a rotational direction of the first housing 2. The first, second and third electrodes 22, 23 and 24 having different lengths and extending in a rotational direction of the first housing 2 are disposed on the convex curved surface of the cylindrical portion 28 so that the electrodes are in parallel with each other and spaced. The first hinge portion 21 is linked to the second hinge portion 31 of the second housing 31. The cylindrical portion 28 is disposed within the second housing 3.

The first electrode 22 is adapted to detect the non-speech call communication mode and the left end electrode of the parallel electrodes on the cylindrical portion 28 when looking at the display and operation side. The first electrode a 22 is the shortest and is brought into contact or non-contact with a first spring terminal 32, forming a switch when the angle between the first and second housings 2 and 3 is about 30°. The second electrode 23 is adapted to detect the hand-free speech call mode and the intermediate electrodes of the Parallel electrodes on the cylindrical portion 28 when looking at the display and operation side. The second electrode 23 has a length which is between those of the first and third electrodes 22 and 24. When the angle between the first and second housing is about 100°, the second electrode is brought into contact or non-contact with the second spring terminal 33, forming a switch. The third electrode 24 is adapted to detect the normal speech call mode and the right end electrode of the parallel electrodes on the cylindrical portion 28 when looking at the display and operation side and is the longest electrode and is constantly in contact with the third spring terminal 24. The surface of the cylindrical portion 28 excepting the electrodes is not electrically conductive. The present invention is not limited to the above-mentioned arrangement. Desired angles at which the electrodes are brought into electrical contact with the corresponding spring terminals can be detected by providing respective electrodes having predetermined lengths.

The second housing 3 is on the operation side and comprises a second hinge portion 31, first, second and third spring terminals 32, 33 and 34, key unit 35 and a microphone 36. The cylindrical portion 28 of the first housing is disposed -within the second housing 3.

The second hinge portion 31 is disposed on the side end face of the second housing 3 facing the first housing 2 and is linked to the first hinge portion 21 of the first housing.

The first spring terminal 32 extends from a given electronic component which is incorporated in the second housing and are adapted to detect the non-speech call mode. The first spring terminal 32 is the left end terminal of the parallel terminals when viewing the display and operation side and is brought into contact or non-contact with the first electrode 22 when the angle between the first and second housings 2 and 3 is about 30° forming a switch. The second spring terminal 33 extends from a given electronic component which are incorporated in the second housing and is adapted to detect the hands-free speech call mode.

The second spring terminal 33 is the intermediate end terminal of the parallel terminal when viewing the display and operation side and is brought into contact or non-contact with the first electrode 23 when the angle between the first and second housings 2 and 3 is about 100°, forming a switch. The third spring terminal 23 extend from predetermined electronic component which is incorporated in the second housing and is adapted to detect the normal speech call mode. The third spring terminal 34 is the right end terminal of the parallel terminals when viewing the display and operation side and is normally in contact with the first electrode 24.

Operation of the embodiment of the present invention will be described. FIG. 2 is a schematic view showing the foldable portable cellular phone in which the opening and closing angle detecting apparatus of one embodiment of the present invention is incorporated. FIGS. 2(A-1) to 2(A-3) show the folding angles as viewed from the lateral side of the foldable portable cellular phone. FIGS. 2(B-1) to 2(B-3) show the contact conditions between the terminals and the electrodes depending upon the folding angles. FIGS. 2(C-1) to 2(C-3) show respective switching conditions.

In the condition shown in FIG. 2(A-1) the first and second electrodes 22 and 23 are not in electrical contact with the first and second spring terminals 32 and 33, respectively and only the third electrode 24 is electrically connected with the third spring terminal 34 as shown in FIG. 2(B-1). Only the right end circuit is conductive as shown in FIG. 2(C-1). In the condition shown in FIG. 2(A-2), the first electrode 22 is not electrically connected with the corresponding first spring terminal 32 and the second and third electrodes 23 and 24 are electrically connected with the second and third spring terminals 33 and 34, respectively as shown in FIG. 2(B-2). The right end and intermediate circuits are electrically conductive as shown in FIG. 2(C-2). In the condition shown in FIG. 2(A-3), all three electrodes are electrically connected to the corresponding spring terminals. All three circuits are electrically conductive as shown in FIG. 2(C-3).

The electrical level of respective spring terminals can be detected for conducting the angle detection by means of the angle detecting means by electrically grounding or pull-up connecting the electrodes and the spring terminals. For example, if the electrodes and the spring terminals are Pulled up, the left and intermediate contacts are on electrically low level and the right contact are on the electrically high level in case shown in FIG. 2(C-1). Similarly, the left end contact is on the electrically low level and the intermediate and right end contacts are on the electrically high level in case shown in FIG. 2(C-2). The all contacts are on the high level in case shown in FIG. 2(C-3). In such a manner, detection of the hinge angle can be conducted by detecting the electrical level on the respective connection lines.

Although the embodiment having three connection lines has been described, more precise angle detection can be conducted by increasing the number of the connection lines. Separation of the terminals and contact with unwanted other terminals can be prevented by providing the electrodes on the curved circumferential surface of the first hinge with grooves for guiding the spring terminals along the electrodes and the curved surface which is the extension of the electrodes.

The meritorious effects of the present invent ion are summarized as follows.

Since the angle detection can be conducted depending upon the relation of the contact between a given number of electrodes and the terminals in the opening and closing angle detecting apparatus of the present invent ion, no special parts are required. If the opening and closing angle detecting apparatus of the present invention is applied to the foldable portable cellular phone, the mode of the phone can be automatically changed to any one of normal speech, hand-free speech and non-speech call modes depending upon the angle of the hinge. This eliminates the troublesome setting of the calling mode which have to be done by the user.

The margin of howling can be increased by presetting the opening angle larger at which the phone is brought into the non-speech call mode. This can positively prevent howling from occurring.

Since the angle detecting means, such as electrodes and the terminals can be provided on the hinge portion in the second housing, the reed switches and magnets which are conventional detecting means can be eliminated so that reduction in size and weight and enhancement in reliability can be achieved.

It should be noted that other objects, features and aspects of the present invention will become apparent in the entire disclosure and that modifications may be done without departing the gist and scope of the present invent ion as disclosed herein and claimed as appended herewith.

Also it should be noted that any combination of the disclosed and/or claimed elements, matters and/or items may fall under the modifications aforementioned.

What is claimed is:

1. An apparatus for detecting an opening and closing angle comprising:

a first hinge portion and a second hinge portion belonging to a first housing and a second housing, respectively, for pivotally linking said first housing to said second housing, wherein extending said first hinge portion has on a convex curved surface in a rotational direction of said first housing and comprises a given number of parallel electrodes extending in a rotational direction of said first housing on said curved surface, said curved surface portion being disposed within said second housing;

said second housing comprising therein a given number of terminals which are in pressure contact with said electrodes or the curved surface; and wherein a first of said terminals is in contact or non-contact with a corresponding electrode at a different predetermined angle than a second of said terminals depending on an angle of said first housing.

2. The apparatus for detecting the opening and closing angle as defined in claim 1, wherein said electrodes have different predetermined lengths to provide different contacting angles with said terminals corresponding to an angle between the first and second hinge portions, and the angle of said hinge portions is detected by detecting connection of said electrodes with said terminals.

3. The apparatus for detecting the opening and closing angle as defined in claim 1, wherein said electrodes have different predetermined lengths extending in parallel with each other, and wherein said terminals are aligned at their tip ends, and have a given length extending in parallel with each other.

4. The apparatus for detecting the opening and closing angle as defined in claim 1, wherein said electrodes are aligned with each other at their ends, have a given length extending in parallel with each other, and wherein said terminals are at their ends in pressure contact with corresponding electrodes at different Positions of the electrodes in a rotational direction thereof.

5. The apparatus for detecting the opening and closing angle as defined in claim 1, wherein said curved surface of said first hinge portion has a groove between each of said electrodes for guiding said terminals along said corresponding electrodes and their extensions.

6. The apparatus for detecting the opening and closing angle as defined claim 1, wherein said terminals comprise springs.

7. A foldable device having said apparatus for detecting the opening and closing angle as defined in claim 1.

8. A foldable device as defined in claim 7, wherein said foldable device comprises a portable cellular phone, a word processor or a personal computer.

9. A foldable device as defined in claim 7, wherein said terminals comprise at least three in number, said foldable device being a portable cellular phone having a plurality of speech call modes so that it can be changed into any one of a normal speech call mode, a hands-free speech call mode and a non-speech call mode.

10. A foldable device as defined in claim 9, wherein the given number of parallel electrodes comprises:

a first electrode configured for a non-speech call mode;

a second electrode configured for a hands-free speech call mode; and a third electrode configured for a normal speech call mode.

11. A foldable device as defined in claim 10, wherein a first electrode length is smaller than a second electrode length, and the second electrode length is smaller than a third electrode length.

12. A foldable device as defined in claim 10, wherein the first electrode is configured to form a switch when the angle between the first and second housings is approximately 30 degrees.

13. A foldable device as defined in claim 10, wherein the second electrode is configured to form a switch when the angle between the first and second housings is approximately 100 degrees.

14. The apparatus for detecting the opening and closing angle as defined in claim 1, wherein said electrodes are configured to guide a corresponding terminal.

* * * * *